(12) United States Patent
Yoon

(10) Patent No.: US 10,406,906 B2
(45) Date of Patent: Sep. 10, 2019

(54) ENGINE MOUNT

(71) Applicants: HYUNDAI MOTOR COMPANY, Seoul (KR); KIA MOTORS CORPORATION, Seoul (KR)

(72) Inventor: Hyoung Jin Yoon, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/800,838

(22) Filed: Nov. 1, 2017

(65) Prior Publication Data

US 2019/0016205 A1 Jan. 17, 2019

(30) Foreign Application Priority Data

Jul. 15, 2017 (KR) .......................... 10-2017-0090007

(51) Int. Cl.
*B60K 5/12* (2006.01)
*F16F 13/26* (2006.01)
*F16F 13/10* (2006.01)

(52) U.S. Cl.
CPC .......... *B60K 5/1283* (2013.01); *B60K 5/1208* (2013.01); *F16F 13/107* (2013.01); *F16F 13/262* (2013.01); *F16F 2228/066* (2013.01)

(58) Field of Classification Search
CPC .... F16F 1/06; F16F 13/06; F16F 13/22; F16F 13/26; B60K 5/12; B60K 5/1208; B60K 5/1291
USPC ...................................... 267/140.14, 140.15
See application file for complete search history.

(56) References Cited

U.S. PATENT DOCUMENTS 4,877,225 A * 10/1989 Noguchi ............... F16F 13/262
  267/140.14
5,388,812 A * 2/1995 Kojima ................... F16F 13/18
  267/140.13
5,820,113 A 10/1998 Laughlin
6,364,294 B1 * 4/2002 Gennesseaux ........ F16F 13/264
  267/140.13
9,987,915 B1 * 6/2018 Yoon .................... B60K 5/1208
(Continued)

FOREIGN PATENT DOCUMENTS

CN 104074919 A 10/2014
JP 07-71515 A 3/1995
(Continued)

*Primary Examiner* — Christopher P Schwartz
(74) *Attorney, Agent, or Firm* — Morgan, Lewis & Bockius LLP

(57) ABSTRACT

An engine mount includes: an insulator disposed in a case which has a liquid chamber; an orifice plate dividing the liquid chamber into an upper liquid chamber and a lower liquid chamber, the orifice plate dividing the upper liquid chamber together with the insulator and having an orifice therein for inducing flow of fluid between the upper liquid chamber and the lower liquid chamber; and a diaphragm disposed under the orifice plate inside the case, the diaphragm dividing the lower liquid chamber together with the orifice plate. The orifice plate has a direct passage for enabling the upper liquid chamber and the lower liquid chamber to directly communicate with each other so that liquid flows between the upper liquid chamber and the lower liquid chamber, and includes an opening/closing piston for opening or closing the direct passage.

17 Claims, 5 Drawing Sheets

(56) References Cited

U.S. PATENT DOCUMENTS

| | | | | |
|---|---|---|---|---|
| 2005/0029720 A1* | 2/2005 | Bodie | ................. | F16F 13/20 |
| | | | | 267/140.14 |
| 2005/0218570 A1* | 10/2005 | Ueki | ................. | F16F 13/107 |
| | | | | 267/140.11 |
| 2008/0174058 A1* | 7/2008 | Saiki | ................. | F16F 13/266 |
| | | | | 267/140.14 |
| 2009/0295050 A1* | 12/2009 | Lee | ................. | F16F 13/105 |
| | | | | 267/140.14 |
| 2013/0256960 A1* | 10/2013 | Marienfeld | ............ | F16F 13/10 |
| | | | | 267/140.14 |
| 2016/0138671 A1* | 5/2016 | Kim | ................. | F16F 13/22 |
| | | | | 267/140.14 |
| 2017/0276208 A1* | 9/2017 | Kim | ................. | B60K 5/1283 |
| 2017/0313171 A1* | 11/2017 | Yoon | ................. | B60K 5/1208 |

FOREIGN PATENT DOCUMENTS

| | | |
|---|---|---|
| JP | 08-93849 A | 4/1996 |
| JP | 2710669 B2 | 2/1998 |
| JP | 2009-052589 A | 3/2009 |
| JP | 2009-052590 A | 3/2009 |
| KR | 10-2011-0097242 A | 8/2011 |

* cited by examiner

- Prior Art -

ENGINE MOUNT

CROSS-REFERENCE TO RELATED APPLICATION

This application claims under 35 U.S.C. § 119(a) the benefit of priority to Korean Patent Application No. 10-2017-0090007 filed on Jul. 15, 2017, the entire content of which IS incorporated herein by reference.

TECHNICAL FIELD

The present disclosure relates to an engine mount. More particularly, the present disclosure relates to a semi-active engine mount for a vehicle, capable of minimizing an increase in manufacturing costs and weight through reduction in the number of parts and simplification of the structure thereof.

BACKGROUND

Recently, with development of technologies related to vehicles and increased consumer demand for low vibration and low noise, many efforts have been made to maximize riding comfort by analyzing noise, vibration and shocks that occur in a vehicle.

While the vehicle travels, vibration that occurs in a specific engine RPM range is transferred to the interior of the vehicle at a specific frequency via the vehicle body. At this time, the effect of combustion force of the engine on the interior of the vehicle is very large.

Vibration always occurs in an engine of a vehicle due to the structural features thereof, such as a periodic change in the center positions of a piston and a connecting rod due to vertical reciprocating motion thereof, an inertial force of a reciprocating part that acts in the axial direction of a cylinder, an inertial force of a connecting rod that shakes to the left and right of a crankshaft, and a periodic change in the rotational force that is applied to a crankshaft.

Therefore, in order to attenuate noise and vibration transferred from the engine and to support the engine, an engine mount is installed between the engine and the vehicle body. The engine mount is largely classified into a rubber engine mount, an air-damping mount, and a fluid-filled engine mount.

The rubber engine mount, which is formed of a rubber material, is very vulnerable to low-frequency and large-displacement vibration, and cannot sufficiently attenuate both high-frequency and small-amplitude vibration and low-frequency and large-displacement vibration.

Accordingly, a fluid-filled engine mount is being widely used, which absorbs and attenuates all vibration over a wide range, including high-frequency and small-amplitude vibration and low-frequency and large-displacement vibration, which are transferred to the engine mount by operation of the engine.

The fluid-filled engine mount is also referred to as a fluid mount or a hydro-mount, and has a structure in which damping force is generated as fluid encapsulated in the region below an insulator flows through a flow passage between an upper liquid chamber and a lower liquid chamber. Such a fluid-filled engine mount has an advantage of attenuating both high-frequency vibration (small-displacement vibration) and low-frequency vibration (large-displacement vibration) depending on the situation.

Recently, in order to improve the vibration-isolating performance of the fluid-filled engine mount, an active mount and a semi-active mount have been developed.

When the engine is idling, it is advantageous in terms of improvement of noise, vibration and harshness (NVH) performance to enhance vibration-isolating performance by reducing the dynamic characteristics of the mount. When the vehicle is traveling, it is advantageous to enhance the riding comfort performance by increasing a loss coefficient.

However, the currently developed fluid-filled engine mount has a problem in that the dynamic characteristics thereof and the loss coefficient are incompatible with each other, and thus, when it is intended to reduce the dynamic characteristics, the loss coefficient is reduced, whereas when it is intended to increase the loss coefficient, the dynamic characteristics are increased.

A semi-active mount (a switchable mount) has been developed in order to solve this problem. The semi-active mount is characterized in that when the engine is idling, the dynamic characteristics of the mount are reduced and in that when the vehicle is traveling, the loss coefficient is increased. Therefore, the semi-active mount is being widely used in vehicles.

However, the conventional semi-active mount needs to use a large-capacity coil so as to correspond to the rigidity of the rubber spring, and has a great number of parts, such as an actuator, and a complicated structure, resulting in a great increase in manufacturing costs and weight. Further, the conventional semi-active mount is larger than the fluid-filled mount (the hydro-mount), making it difficult to manufacture in a package.

The above information disclosed in this Background section is only for enhancement of understanding of the background of the invention, and therefore, it may contain information that does not form the prior art that is already known in this country to a person of ordinary skill in the art.

SUMMARY OF THE DISCLOSURE

The present disclosure has been made in an effort to solve the above-described problems associated with the prior art, and it is an object of the present disclosure to provide a semi-active engine mount for a vehicle, which may reduce dynamic characteristics when the engine is idling and may increase a loss coefficient when the vehicle is traveling, thereby enhancing the vibration-isolating performance during engine idling as well as during the travel of the vehicle, and consequently improving NVH performance and riding comfort.

It is another object of the present disclosure to provide a semi-active engine mount for a vehicle, which may minimize an increase in manufacturing costs and weight through reduction in the number of parts and simplification of the structure thereof, compared to a conventional semi-active engine mount, and which may be advantageous in terms of manufacturing of the mount in a package through reduction in size to a level equivalent to the size of the fluid-filled mount (the hydro-mount).

In one aspect, the present disclosure provides an engine mount including an insulator disposed in a case which has a liquid chamber, an orifice plate for dividing the liquid chamber into an upper liquid chamber and a lower liquid chamber, the orifice plate forming the upper liquid chamber together with the insulator and having therein an orifice for inducing flow of fluid between the upper liquid chamber and the lower liquid chamber, and a diaphragm disposed under the orifice plate within the case, the diaphragm forming the lower liquid chamber together with the orifice plate, wherein the orifice plate has therein a direct passage for enabling the upper liquid chamber and the lower liquid chamber to directly communicate with each other so that liquid flows between the upper liquid chamber and the lower liquid chamber, and includes an opening/closing piston for opening or closing the direct passage, and wherein the opening/closing piston includes a coil mounted inside the orifice plate and configured to generate magnetic force when current is applied thereto, and an opening/closing cylinder configured to move so as to selectively open or close the direct passage depending on whether current is applied to the coil and on whether the coil generates magnetic force.

Other aspects and exemplary embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
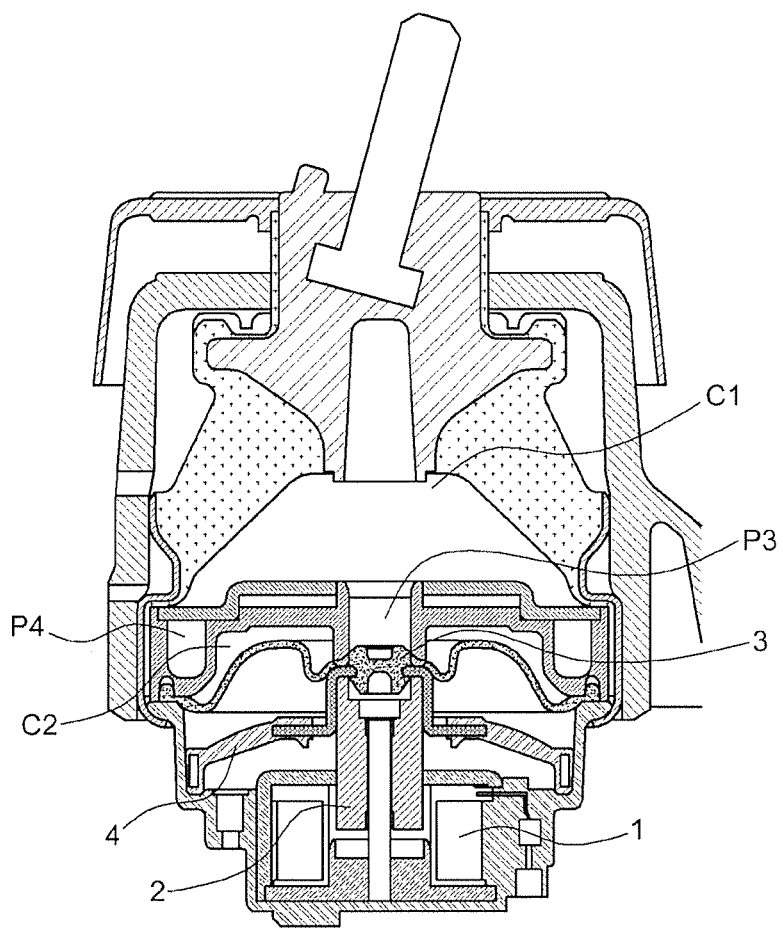
FIG. 1 is a sectional view illustrating a conventional semi-active engine mount.

It should be understood that the appended drawings are not necessarily to scale, presenting a somewhat simplified representation of various features illustrative of the basic principles of the invention. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

Hereinafter, reference will now be made in detail to various embodiments of the present disclosure, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Throughout the specification, when an element is referred to as "including" another element, the element should not be understood as excluding other elements, so long as there is no special conflicting description, and the element may include at least one other element.

A conventional semi-active engine mount (a switchable mount) will first be explained briefly for better understanding of the invention.

FIG. 1 is a sectional view illustrating a conventional semi-active engine mount. As shown in the drawing, the conventional engine mount is structured such that an actuator, which includes a coil 1 and a bobbin 2, protrudes far downwards from the bottom of the engine mount.

In such a conventional semi-active engine mount, when it is needed to increase the vibration-isolating performance by reducing the dynamic characteristics, e.g. when the engine is idling, current is applied to the coil 1.

When current is applied to the coil 1, the bobbin 2, to which a permanent magnet (not shown) is mounted, is pulled downwards by electromagnetic driving force, and a cap 3, which is mounted on the bobbin 2, is separated from a flow passage P3.

At this time, the flow passage P3, which enables an upper liquid chamber C1 and a lower liquid chamber C2 to communicate with each other therethrough, enters an open state. As the fluid flows through the flow passage P3, the dynamic characteristics of the mount are reduced.

When the vehicle is traveling, current is not applied to the coil 1, and electromagnetic driving force is not generated. Therefore, the bobbin 2 is moved upwards by the elastic restoring force of a rubber spring 4, and the cap 3, which is mounted on the bobbin 2, closes the flow passage P3.

Accordingly, the fluid flows through a separate bypass passage P4 (an inertia track), which enables the upper liquid chamber C1 and the lower liquid chamber C2 to communicate with each other therethrough, thereby increasing the loss coefficient in the mount.

However, in the above-described conventional engine mount, after the supply of current is stopped and the bobbin 2 is moved upwards by the elastic force of the rubber spring 4, the flow passage P3 needs to be maintained in a closed state by the force (sustaining force) of the rubber spring 4 until current is again applied to the coil 1.

That is, the rubber spring 4 supports the bobbin 2, which has moved upwards, so as to prevent the bobbin 2 from moving downwards due to the hydraulic pressure applied to the bobbin 2 from the upper liquid chamber C1, thereby maintaining the position of the cap 3 that is closing the flow passage P3.

In particular, in order to prevent the flow passage P3 from being opened by a large pressure while the vehicle is traveling, the rubber spring 4 needs to have sufficient rigidity to securely support the bobbin 2 and the cap 3.

Further, when current is applied to the coil 1, it is necessary to pull the bobbin 2 downwards with a large force so that the cap 3 opens the flow passage P3. Thus, in order to enable the bobbin 2 to move downwards against the rigidity of the rubber spring 4, the coil 1 needs to generate a large driving force, and consequently needs to be increased in size.

Therefore, the conventional semi-active engine mount is inevitably larger than the fluid-filled engine mount, leading to a great increase in manufacturing costs and weight and being disadvantageous in terms of manufacturing of the mount in a package and installation of the mount.

The present disclosure provides a semi-active engine mount for a vehicle, which may enhance the vibration-isolating performance during engine idling as well as during the travel of the vehicle, which may improve the NVH performance and the riding comfort, which may minimize an increase in manufacturing costs and weight through reduction in the number of parts and simplification of the structure thereof, and which may be advantageous in terms of manufacturing of the mount in a package through reduction in size to a level equivalent to the size of the fluid-filled mount.

Hereinafter, the construction of the engine mount according to the embodiment of the present disclosure will be described.

Figure 2:
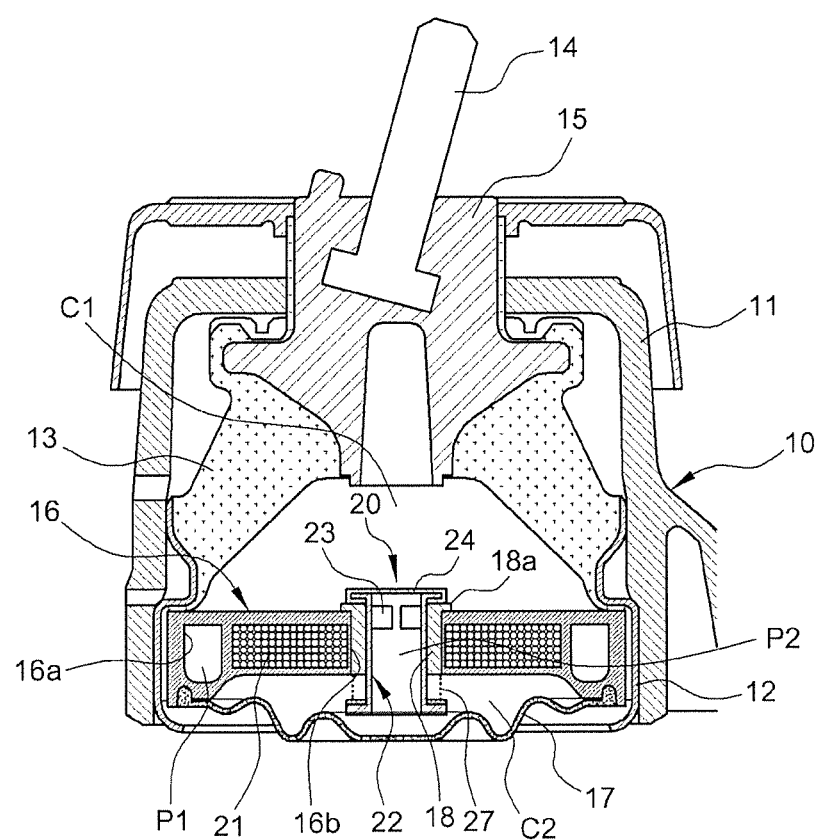
FIG. 2 is a sectional view illustrating a semi-active engine mount according to an embodiment of the present disclosure.
Figure 3:
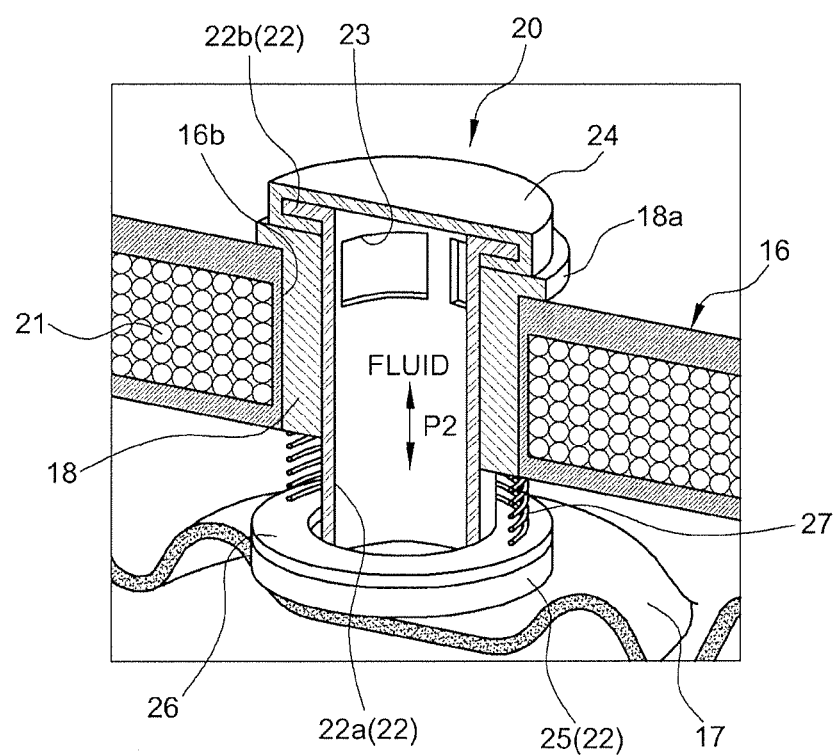
FIG. 3 is a perspective view illustrating a direct passage and an opening/closing piston in the semi-active engine mount according to the embodiment of the present disclosure.

FIG. 2 is a sectional view illustrating the construction of an engine mount according to an embodiment of the present disclosure, and FIG. 3 is a perspective view illustrating a direct passage and an opening/closing piston in a semi-active engine mount according to an embodiment of the present disclosure.

The engine mount according to the embodiment of the present disclosure is installed between the engine and the vehicle body in order to achieve vibration isolation. As shown in the drawings, the engine mount includes a center bolt 14, which is mounted to the engine, an inner core 15, to which the center bolt 14 is coupled, and an insulator 13, which is made of a rubber material and is formed so as to be integrally coupled to the inner core 15.

The insulator 13 is also referred to as a main rubber or a mount rubber. The insulator 13 is located at the upper portion inside a case 10 in order to fixedly support the inner core 15, and forms an upper liquid chamber C1 together with an orifice plate 16, which is located thereunder.

The case 10 includes an upper body 11 and a lower body 12. The lower portion of the insulator 13 is fixedly fitted in the lower body 12 of the case 10 such that the lower body 12 surrounds the lower portion of the insulator 13 and the lower body 12 is inserted into and coupled to the upper body 11.

The lower body 12 serves to protect a diaphragm 17, which is located therein.

The upper body 11 of the case 10 envelops the insulator 13, and is coupled to the outer surface of the upper portion of the lower body 12 so as to be mounted to the vehicle body via a mounting bracket (not shown).

The orifice plate 16 is mounted in the transverse direction in the case 10 in order to divide the liquid chamber in the mount into the upper liquid chamber C1 and the lower liquid chamber C2. Further, the orifice plate 16 has therein an orifice 16a, which forms a bypass passage P1 for inducing the flow of fluid between the upper liquid chamber C1 and the lower liquid chamber C2.

The orifice plate 16 further has therein a hole (not shown) formed to enable the orifice 16a and the upper liquid chamber C1 to communicate with each other therethrough and a hole (not shown) formed to enable the orifice 16a and the lower liquid chamber C2 to communicate with each other therethrough.

Accordingly, the fluid is able to flow between the upper liquid chamber C1 and the orifice 16a and between the lower liquid chamber C2 and the orifice 16a through the holes formed in the orifice plate 16.

That is, the orifice 16a serves to provide a flow passage through which the fluid flows. Specifically, since the orifice 16a communicates both with the upper liquid chamber C1 and with the lower liquid chamber C2 through the holes, the orifice 16a provides a kind of flow passage that connects the upper liquid chamber C1 and the lower liquid chamber C2 to each other, i.e. a flow passage through which the fluid is able to flow between the two liquid chambers C1 and C2.

Inside the case 10, a diaphragm 17 for forming the lower liquid chamber C2 is provided under the orifice plate 16. Thus, the orifice plate 16 and the diaphragm 17 define the lower liquid chamber C2.

The mount has therein the upper liquid chamber C1 defined between the orifice plate 16 and the insulator 13 and the lower liquid chamber C2 defined between the orifice plate 16 and the diaphragm 17. These liquid chambers provided in the case 10 are filled with fluid.

In other words, the upper liquid chamber C1 is formed at the inner upper portion of the case 10 and the lower liquid chamber C2 is formed at the inner lower portion of the case 10, with the orifice plate 16 interposed therebetween.

The diaphragm 17 may be deformed in accordance with the vibration transferred to the mount, the flow of fluid between the upper liquid chamber C1 and the lower liquid chamber C2 due to vibration, or the pressure of the fluid in the lower liquid chamber C2. When the diaphragm 17 is deformed, the volume of the lower liquid chamber C2, which is filled with fluid, also changes.

The orifice plate 16 has a through-hole 16b formed so as to penetrate the center portion thereof. A pipe-shaped passage cylinder 18 is inserted into and coupled to the through-hole 16b.

The passage cylinder 18 includes a flange portion 18a, which is formed at the upper end thereof so as to be in close contact with the top surface of the orifice plate 16 within the upper liquid chamber C1. The flange portion 18a is formed so as to extend from the upper end of the passage cylinder 18 in the radial direction.

The pipe-shaped passage cylinder 18 is mounted so that the inner space thereof is used as a flow passage between the upper liquid chamber C1 and the lower liquid chamber C2. Specifically, the inner space in the passage cylinder 18 becomes a linear flow passage that directly communicates with the upper liquid chamber C1 and the lower liquid chamber C2 therebetween and connects the upper liquid chamber C1 and the lower liquid chamber C2 to each other.

As such, the flow passage P2, which is formed by the passage cylinder 18, becomes a linear flow passage that directly connects the upper liquid chamber C1 and the lower liquid chamber C2, i.e. a direct passage through which the fluid flows straight between the upper liquid chamber C1 and the lower liquid chamber C2.

In the engine mount of the present disclosure, the flow passage P1, which is formed by the orifice 16a, becomes an annular-shaped flow passage that is located inside the orifice plate 16, i.e. an inertia track. Specifically, the flow passage P1 is a kind of bypass passage, through which the fluid flows along a detour route in the circumferential direction of the orifice plate 16 between the upper liquid chamber C1 and the lower liquid chamber C2.

Unlike this, the flow passage P2, which is formed by the passage cylinder 18, becomes a kind of direct passage, through which the fluid flows straight along the center portion of the orifice plate 16 between the upper liquid chamber C1 and the lower liquid chamber C2.

When it is needed to increase the vibration-isolating performance by reducing the dynamic characteristics, e.g. when the engine is idling, the engine mount of the present disclosure operates such that the fluid flows through the central direct passage P2, which is formed by the passage cylinder 18, whereby the dynamic characteristics of the mount are reduced.

On the other hand, when the vehicle starts from the engine idling state and travels, the engine mount operates such that the direct passage P2 is blocked and the fluid flows through the bypass passage P1, whereby the loss coefficient in the mount is increased.

The orifice plate 16 includes an opening/closing piston 20, which selectively opens or closes the direct passage P2 formed by the passage cylinder 18 in response to a control signal output from a controller (not shown).

The opening/closing piston 20 includes a coil 21, which is mounted inside the orifice plate 16 and generates magnetic force when current is applied thereto.

The coil 21 is mounted in the manner of being wound around the through-hole 16b and the passage cylinder 18 inside the orifice plate 16.

In response to a control signal output from the controller (not shown), an external power source such as a battery of the vehicle selectively applies current to the coil 21. To this end, there is provided a circuit that operates to selectively apply current from an external power source to the coil 21 in response to a control signal from the controller.

Because the controller and the circuit for selectively applying current to the coil 21 in response to a control signal from the controller are well-known components that are currently used for a conventional semi-active engine mount, a detailed explanation thereof will be omitted.

The opening/closing piston 20 includes an opening/closing cylinder 22, which moves so as to selectively open or close the direct passage P2 formed by the passage cylinder 18 depending on whether current is applied to the coil 21.

In the engine mount of the present disclosure, the opening/closing cylinder 22 is configured to move so as to selectively open or close the direct passage P2 depending on whether current is applied to the coil 21 and on whether the coil 21 generates magnetic force.

Described in detail, the opening/closing piston 20 includes the opening/closing cylinder 22, which is moved so as to open the direct passage P2 by the electromagnetic driving force that is generated by interaction with the coil 21 when current is applied to the coil 21, and further includes an elastic member 27, which returns the opening/closing cylinder 22 to its original position so as to block the direct passage P2 when the application of current to the coil 21 is stopped.

The opening/closing cylinder 22 is formed in a pipe shape, and is inserted into and coupled to the passage cylinder 18. The opening/closing cylinder 22 is mounted so as to slide along the inner surface of the passage cylinder 18 in the state in which the outer surface of the opening/closing cylinder 22 is in close contact with the inner surface of the passage cylinder 18.

That is, in the case in which both the passage cylinder 18 and the opening/closing cylinder 22 are formed to have a cylindrical pipe shape, the opening/closing cylinder 22 slides along the inner circumferential surface of the passage cylinder 18 in the state in which the outer circumferential surface of the opening/closing cylinder 22 is in close contact with the inner circumferential surface of the passage cylinder 18.

To this end, the inner diameter of the passage cylinder 18 and the outer diameter of the opening/closing cylinder 22 are set so as to allow the sliding motion of the opening/closing cylinder 22 while maintaining close contact between the inner circumferential surface of the passage cylinder 18 and the outer circumferential surface of the opening/closing cylinder 22.

The opening/closing cylinder 22 includes a pipe-shaped portion 22a, a first stopper 22b, which is formed at the upper end of the pipe-shaped portion 22a and extends in the radial direction, and a second stopper 25, which is formed at the lower end of the pipe-shaped portion 22a and extends in the radial direction. The first stopper 22b may be formed integrally with the upper end of the pipe-shaped portion 22a.

The second stopper 25 may be integrally and fixedly mounted to the lower end of the pipe-shaped portion 22a so as to be located under the orifice plate 16 and the passage cylinder 18. Specifically, the second stopper 25 may be manufactured using a steel material and may be fixedly mounted to the lower end of the pipe-shaped portion 22a.

The first stopper 22b and the second stopper 25 may be formed continuously in the circumferential direction at the upper end and the lower end of the pipe-shaped portion 22a, and consequently each of the stoppers may have a flange shape overall.

When the opening/closing cylinder 22 is moved downwards to the lower limit position by the elastic restoring force of the elastic member 27, the first stopper 22b is caught by the top surface of the flange portion 18a of the passage cylinder 18. As such, when the opening/closing cylinder 22 is moved downwards to the lower limit position, the first stopper 22b serves to restrict the downward movement of the opening/closing cylinder 22 by being caught by the flange portion 18a of the passage cylinder 18, thereby preventing the opening/closing cylinder 22 from moving downwards beyond the lower limit position.

Of course, in the case in which the flange portion 18a is not formed at the passage cylinder 18, configuration may be made such that the first stopper 22b is caught by the upper end surface of the passage cylinder 18 or the top surface of the orifice plate 16.

The first stopper 22b, as described above, not only serves to restrict downward movement of the opening/closing cylinder 22 by being caught by the flange portion 18a of the passage cylinder 18 so that the opening/closing cylinder 22 is prevented from moving downwards beyond the lower limit position, but also serves to completely block the flow passage so that the fluid cannot flow between the upper liquid chamber C1 and the inner space in the opening/closing cylinder 22 because the bottom surface of the first stopper 22b comes into complete contact with the top surface of the flange portion 18a of the passage cylinder 18 (or the upper end surface of the passage cylinder, or the top surface of the orifice plate) when the opening/closing cylinder 22 moves downwards to the lower limit position.

On the other hand, when the opening/closing cylinder 22 is moved upwards to the upper limit position by the electromagnetic force that is generated between the opening/closing cylinder 22 and the coil 21, the second stopper 25 is caught by the lower end surface of the passage cylinder 18 and the bottom surface of the orifice plate 16. As such, when the opening/closing cylinder 22 is moved upwards to the upper limit position, the second stopper 25 serves to restrict the upward movement of the opening/closing cylinder 22 by being caught by the passage cylinder 18 and the orifice plate 16, thereby preventing the opening/closing cylinder 22 from moving upwards beyond the upper limit position.

Further, the second stopper 25 of the opening/closing cylinder 22 also serves to support the bottom of the elastic member 27. Specifically, the second stopper 25 may serve to provide an elastic member installation surface so that the elastic member 27 is installed between the opening/closing cylinder 22 and the orifice plate 16 or between the opening/closing cylinder 22 and the passage cylinder 18.

Furthermore, since the second stopper 25 is made of a steel material, as described later, when the coil 21 becomes magnetic like an electromagnet due to current applied thereto, the second stopper 25 is pulled by the coil 21, which acts as an electromagnet. Accordingly, the whole opening/closing cylinder 22, to which the second stopper 25 is integrally mounted, moves upwards so as to open the direct passage P2.

The opening/closing cylinder 22 further has a fluid-passing hole 23 formed in the side surface of the upper end portion thereof. Specifically, the fluid-passing hole 23 is formed in the side surface of the upper end portion of the pipe-shaped portion 22a, which is located below near the first stopper 22b.

The fluid-passing hole 23 may be provided in a plural number such that the fluid-passing holes 23 may be arranged in the upper portion of the opening/closing cylinder 22 so as to be spaced a predetermined distance apart from each other in the circumferential direction of the opening/closing cylinder 22.

When the opening/closing cylinder 22 is moved upwards by the electromagnetic force generated between the opening/closing cylinder 22 and the coil 21, that is, when the opening/closing cylinder 22 is moved upwards by the second stopper 25 being pulled by the magnetic force of the coil 21 that acts as an electromagnet, the fluid-passing hole 23 escapes from the inner space in the passage cylinder 18 and is exposed to the upper liquid chamber C1.

Accordingly, the fluid in the upper liquid chamber C1 passes through the fluid-passing hole 23 and flows to the lower liquid chamber C2 via the inner space in the opening/closing cylinder 22, or the fluid in the lower liquid chamber C2 is introduced into the inner space in the opening/closing cylinder 22, passes through the fluid-passing hole 23, and flows to the upper liquid chamber C1.

That is, the direct passage P2 between the upper liquid chamber C1 and the lower liquid chamber C2 enters an open state.

On the other hand, when the opening/closing cylinder 22 is moved downwards by the elastic restoring force of the elastic member 27, the fluid-passing hole 23 is located in the inner space in the passage cylinder 18. At this time, since the first stopper 22b is in close contact with the top surface of the flange portion 18a of the passage cylinder 18, the opening/closing cylinder 22 completely blocks the direct passage P2 between the upper liquid chamber C1 and the lower liquid chamber C2.

The lower end of the opening/closing cylinder 22, to which the second stopper 25 is mounted, is opened, and accordingly, the fluid is able to flow into or out of the inner space in the opening/closing cylinder 22 through the opened lower end of the opening/closing cylinder 22.

On the other hand, the upper end of the opening/closing cylinder 22, at which the first stopper 22b is formed, has a sealed structure. To this end, the opening/closing cylinder 22 is provided at the upper end thereof with a seal 24, which has a membrane structure so as to seal the upper end of the opening/closing cylinder 22.

The seal 24 may be formed so as to envelop the upper end portion of the opening/closing cylinder 22. It is desirable for the seal 24 to have a structure that blocks the upper end of the opening/closing cylinder 22 and that also envelops the top surface and the bottom surface of the first stopper 22b.

When the opening/closing cylinder 22 moves downwards and the bottom surface of the first stopper 22b therefore comes into contact with the top surface of the flange portion 18a of the passage cylinder 18, the seal 24, which envelops the first stopper 22b, actually comes into contact with the top surface of the flange portion 18a of the passage cylinder 18.

Therefore, it is desirable for the seal 24 to be made of an elastic material such as rubber in order to absorb or damp shocks and to prevent the occurrence of noise when the opening/closing cylinder 22 moves downwards and the first stopper 22b (or the seal) therefore comes into contact with the flange portion 18a of the passage cylinder 18.

In the state in which the opening/closing cylinder 22 is pulled upwards to the upper limit position due to the application of current to the coil 21, if the application of current to the coil 21 is stopped, the elastic member 27 provides elastic restoring force for the opening/closing cylinder 22 so that the opening/closing cylinder 22 moves downwards and returns to its original position.

To this end, the elastic member 27 may be mounted between the opening/closing cylinder 22 and the orifice plate 16 or between the opening/closing cylinder 22 and the passage cylinder 18 so as to generate elastic restoring force in the direction in which the opening/closing cylinder 22 moves downwards and returns to its original position.

Referring to FIG. 3, the elastic member 27 may be a coil spring. Specifically, as shown in the drawing, the elastic member 27 may be a coil spring, which is mounted around the lower end portion of the opening/closing cylinder 22.

The elastic member 27 may be mounted between the second stopper 25 of the opening/closing cylinder 22 and the orifice plate 16 or between the second stopper 25 of the opening/closing cylinder 22 and the passage cylinder 18, and more particularly, may be mounted between the top surface of the second stopper 25 and the bottom surface of the orifice plate 16 or between the top surface of the second stopper 25 and the lower end surface of the passage cylinder 18.

The lower end of the elastic member 27 may be directly seated on and supported by the top surface of the second stopper 25. However, it is desirable for an elastic pad 26 to be attached to the top surface of the second stopper 25 in order to reduce shocks and for the elastic member 27 to be seated on and supported by the elastic pad 26.

That is, the elastic pad 26 is disposed between the second stopper 25 and the orifice plate 16 (or the passage cylinder 18). Alternatively, the elastic pad 26 may be mounted to the bottom surface of the orifice plate 16 or the passage cylinder 18, rather than to the top surface of the second stopper 25.

The elastic pad 26 may be made of an elastic material such as rubber, in order to absorb or damp shocks and to prevent the occurrence of noise between the second stopper 25 and the orifice plate 16 (or the passage cylinder 18) when the opening/closing cylinder 22 moves upwards.

The construction of the engine mount according to the embodiment of the present disclosure has been described above, and the operation thereof will now be described with reference to FIGS. 4 and 5.

Figure 4:
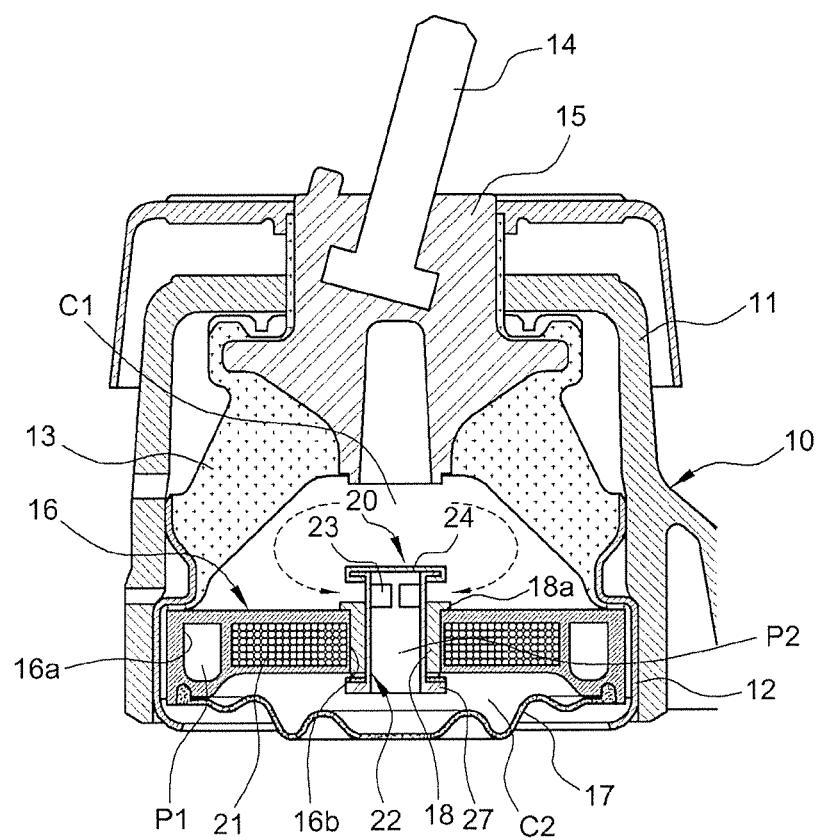
FIGS. 4 and 5 are views illustrating the operational state of the semi-active engine mount according to the embodiment of the present disclosure.
Figure 5:
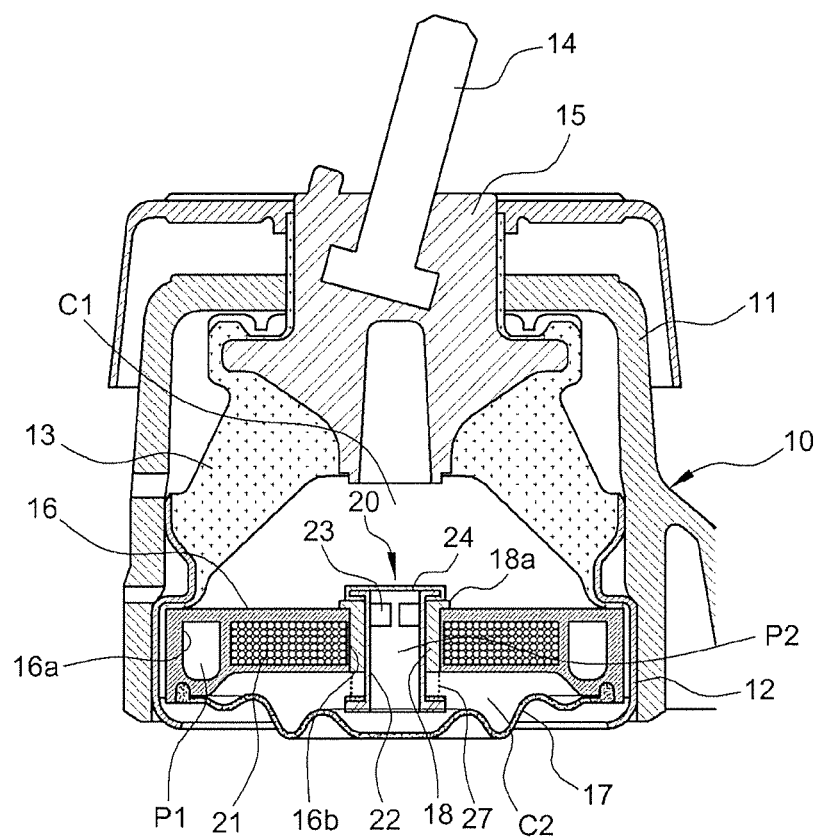

FIG. 4 illustrates the state in which the direct passage P2 between the upper liquid chamber C1 and the lower liquid chamber C2 is opened.

When it is needed to increase the vibration-isolating performance by reducing the dynamic characteristics of the mount, e.g. when the engine is idling, current is applied to the coil 21, which is mounted inside the orifice plate 16.

When current is applied to the coil 21, a magnetic field is generated around the coil 21. At this time, the coil 21 becomes magnetic and thus acts as an electromagnet. Accordingly, the coil 21 pulls the second stopper 25, which is made of a steel material, upwards regardless of the direction in which current is applied or the polarity (the N pole or the S pole).

If the second stopper 25 is pulled upwards by the magnetic force of the coil 21, the whole opening/closing cylinder 22, including the second stopper 25, moves upwards, and consequently, as shown in FIG. 4, the fluid-passing hole 23 escapes from the inner space in the passage cylinder 18 to the inner space in the upper liquid chamber C1 and is exposed to the upper liquid chamber C1.

If the fluid-passing hole 23 is located in the space of the upper liquid chamber C1, the fluid in the upper liquid chamber C1 passes through the fluid-passing hole 23 and flows to the lower liquid chamber C2 via the inner spaces of the passage cylinder 18 and the opening/closing cylinder 22, i.e. via the direct passage P2.

As such, since the flow passage, which directly connects the upper liquid chamber C1 and the lower liquid chamber C2 to each other, is opened, the fluid is able to flow between the upper liquid chamber C1 and the lower liquid chamber C2 through the flow passage, whereby the dynamic characteristics of the mount are reduced.

When the opening/closing cylinder 22 is moved upwards by the magnetic force of the coil 21, the elastic member 27 is compressed by the second stopper 25 and accumulates elastic force.

Subsequently, when the vehicle is traveling, current is not applied to the coil 21. When the application of current to the coil 21 is stopped, the opening/closing cylinder 22 is moved downwards to its original position by the elastic force of the elastic member 27, which is applied to the second stopper 25, as shown in FIG. 5.

At this time, the fluid-passing hole 23 in the opening/closing cylinder 22 moves to the inner space in the passage cylinder 18, and when the fluid-passing hole 23 is located in the passage cylinder 18, the first stopper 22b of the opening/closing cylinder 22 comes into close contact with the passage cylinder 18 or the orifice plate 16 and is caught thereby.

Accordingly, the inner spaces of the passage cylinder 18 and the opening/closing cylinder 22, i.e. the direct passage P2, are closed, and thus the fluid cannot flow through the direct passage P2.

As such, since the flow passage, which directly connects the upper liquid chamber C1 and the lower liquid chamber C2 to each other, becomes closed, the fluid is able to flow only through the bypass passage P1, which is formed by the orifice 16a.

As described above, the fluid flows between the upper liquid chamber C1 and the lower liquid chamber C2 only through the bypass passage P1, rather than through the direct passage P2, whereby the loss coefficient in the mount is increased.

As is apparent from the above description, the present disclosure provides an engine mount for a vehicle, which may reduce the dynamic characteristics when the engine is idling and may increase the loss coefficient when the vehicle is traveling, thereby enhancing the vibration-isolating performance during engine idling as well as during the travel of the vehicle, and consequently improving the NVH performance and the riding comfort.

In addition, the engine mount of the present disclosure may minimize an increase in manufacturing costs and weight through reduction in the number of parts and simplification of the structure thereof and may be advantageous in terms of manufacturing of the mount in a package through reduction in size to a level equivalent to the size of the fluid-filled mount.

The conventional engine mount, as shown in FIG. 1, is structured such that the actuator, which includes the coil 1 and the bobbin 2, protrudes far downwards from the bottom of the engine mount; however, the engine mount of the present disclosure is structured such that the coil 21 is mounted inside the orifice plate 16 and the opening/closing piston 20 is mounted to the orifice plate 16 within the lower liquid chamber C2, whereby the space occupied by the actuator in the conventional engine mount shown in FIG. 1 is not necessary.

Accordingly, the engine mount of the present disclosure is reduced in size to a level equivalent to the size of the fluid-filled mount (the hydro-mount), is more advantageous in terms of manufacturing of the mount in a package than the conventional semi-active mount (the switchable mount), and does not require additional package parts for the actuator.

In addition, because the engine mount of the present disclosure does not require a permanent magnet or the like, the number of parts thereof is reduced below that of the conventional semi-active mount, the manufacturing costs and the weight thereof are reduced, and quality control is facilitated.

In addition, in the engine mount of the present disclosure, the seal 24, which has a membrane structure and covers the open upper end of the opening/closing cylinder 22 so as to seal the same, serves as the membrane of the conventional fluid-filled mount. Although it is possible to tune the dynamic characteristics of the mount through adjustment of the diameter of the fluid-passing hole 23 (the diameter of the nozzle), the seal 24 having the membrane structure provides an effect in which the extent to which the dynamic characteristics of the mount are tuned and the operational range of the mount are further increased.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:
1. An engine mount comprising:
an insulator disposed in a case which has a liquid chamber;
an orifice plate dividing the liquid chamber into an upper liquid chamber and a lower liquid chamber, the orifice plate configuring the upper liquid chamber together with the insulator and having an orifice therein for inducing flow of fluid between the upper liquid chamber and the lower liquid chamber;
a diaphragm disposed under the orifice plate inside the case, the diaphragm configuring the lower liquid chamber together with the orifice plate; and
a coil mounted inside the orifice plate and generating magnetic force when current is applied to the coil, wherein the orifice plate has a direct passage for enabling the upper liquid chamber and the lower liquid chamber to directly communicate with each other so that liquid flows between the upper liquid chamber and the lower liquid chamber, and includes an opening/closing mechanism for opening or closing the direct passage, wherein the opening/closing mechanism includes an opening/closing cylinder selectively opening or closing the direct passage by moving depending on whether current is applied to the coil and whether the coil generates magnetic force, wherein the opening/closing cylinder includes:
- a first stopper having a flange shape that extends outwardly from an upper end of the opening/closing cylinder in a radial direction; and
- a second stopper mounted to a lower end of the opening/closing cylinder and having a shape that extends outwardly in a radial direction.

2. The engine mount of claim 1, wherein the orifice plate has therein a through-hole penetrating the orifice plate in a vertical direction, and includes a passage cylinder having a pipe shape and mounted in the through-hole, and wherein the direct passage for allowing fluid to flow between the upper liquid chamber and the lower liquid chamber therethrough is defined by an inner space in the passage cylinder.

3. The engine mount of claim 2, wherein the opening/closing cylinder has a pipe shape and is slidably inserted into the passage cylinder.

4. The engine mount of claim 3, wherein the opening/closing cylinder includes a seal having a membrane structure for enveloping an upper end portion of the opening/closing cylinder to seal an opening in the upper end portion of the opening/closing cylinder, and has a fluid-passing hole in a side surface of the upper end portion of the opening/closing cylinder, and wherein the fluid-passing hole is exposed to an inner space in the upper liquid chamber when the opening/closing cylinder moves upwards toward opening the direct passage.

5. The engine mount of claim 4,
wherein, when the opening/closing cylinder moves downwards for closing the direct passage, the first stopper comes into close contact with the orifice plate or the passage cylinder to prevent fluid from flowing through the direct passage.

6. The engine mount of claim 5, wherein the passage cylinder includes a flange portion extending from an upper end thereof in a_radial direction and being in close contact with a top surface of the orifice plate within the upper liquid chamber.

7. The engine mount of claim 6, wherein the seal envelops the first stopper to absorb or damp shocks and to prevent occurrence of noise between the first stopper and the flange portion of the passage cylinder.

8. The engine mount of claim 5, wherein the seal envelops the first stopper to absorb or damp shocks and to prevent occurrence of noise between the first stopper and the orifice plate or between the first stopper and the passage cylinder.

9. The engine mount of claim 4, wherein the seal is made of an elastic material.

10. The engine mount of claim 2, wherein the coil is disposed around the through-hole and the passage cylinder within the orifice plate.

11. The engine mount of claim 5,
wherein the second stopper is located under the orifice plate and is pulled toward the coil when the coil generates magnetic force so that the opening/closing cylinder moves upwards.

12. The engine mount of claim 11, wherein the opening/closing cylinder includes an elastic pad mounted to a top surface of the second stopper.

13. The engine mount of claim 11, wherein the second stopper is made of a steel material.

14. The engine mount of claim 11, wherein the opening/closing cylinder includes an elastic member disposed between the second stopper and the orifice plate or between the second stopper and the passage cylinder to provide elastic force for the opening/closing cylinder that moves upwards so that the opening/closing cylinder moves downwards.

15. The engine mount of claim 1, wherein the direct passage penetrates the orifice plate in a vertical direction, and the coil is disposed around the direct passage within the orifice plate.

16. The engine mount of claim 1, wherein the opening/closing mechanism further includes an elastic member providing elastic force to return the opening/closing cylinder, and moving by magnetic force generated when current is applied to the coil, wherein the elastic member moves to an original position of the elastic member when application of current to the coil is stopped.

17. The engine mount of claim 1, wherein the opening/closing cylinder disposed in a center of the orifice plate to be surrounded by the orifice plate.

* * * * *